United States Patent [19]

Senft

[11] 4,308,734
[45] Jan. 5, 1982

[54] WORKPIECE DETECTION DEVICE FOR CYCLICAL MACHINES

[75] Inventor: Charles R. Senft, Lancaster, Pa.

[73] Assignee: Federal-Mogul Corporation, Southfield, Mich.

[21] Appl. No.: 141,705

[22] Filed: Apr. 18, 1980

[51] Int. Cl.³ .............................................. B21J 9/20
[52] U.S. Cl. ........................................ 72/3; 72/426; 192/125 A
[58] Field of Search ............... 72/3, 4, 426, 427, 33; 192/125 A; 113/113 C, 113 D; 83/61, 358, 359

[56] References Cited

U.S. PATENT DOCUMENTS

| | | | |
|---|---|---|---|
| 1,696,659 | 12/1928 | Ward | 113/113 C |
| 1,698,888 | 1/1929 | Laxo | 192/125 A |
| 1,818,593 | 8/1931 | Walworth | 72/427 |
| 2,369,298 | 2/1945 | Jongedyk | 72/3 |
| 3,179,764 | 4/1965 | Wintriss | 192/125 A |
| 3,656,139 | 4/1972 | Wintriss | 72/4 |

Primary Examiner—Lowell A. Larson
Attorney, Agent, or Firm—William G. Coon

[57] ABSTRACT

A detection device for positively sensing the ejection of a workpiece from a cyclically operating machine after each operating cycle assuring that no malfunction has occurred, enabling initiation of the next cycle. The device includes a chute having a pivotally mounted section in the floor of the chute which is moveable between a normally raised position and an actuated or lowered position responsive to the weight of an ejected workpiece thereon. Means are provided for sensing the actuated position of the moveable section and conveying a signal to the central control circuit of the machine. The central control circuit of the machine is programmed to prevent further operation if a signal is not received.

10 Claims, 6 Drawing Figures

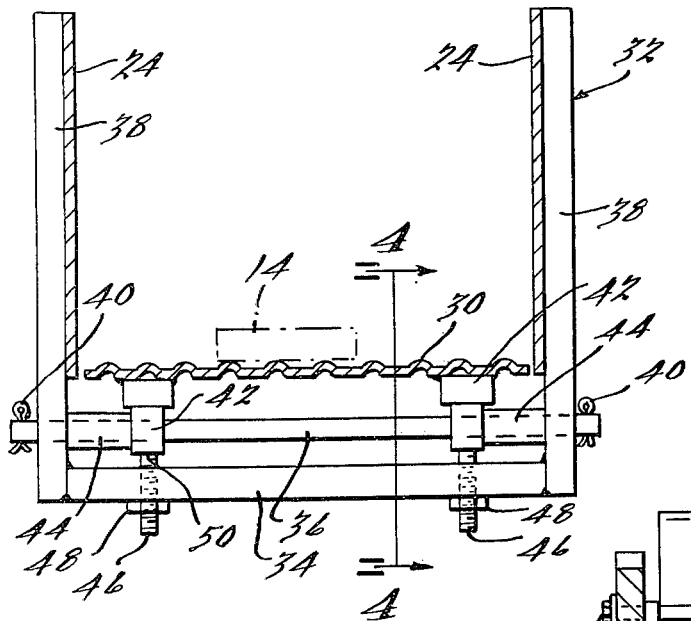
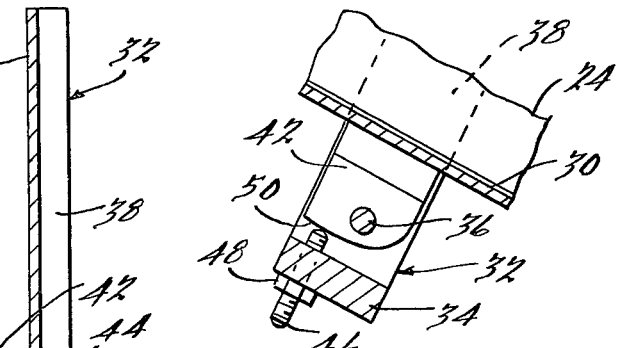
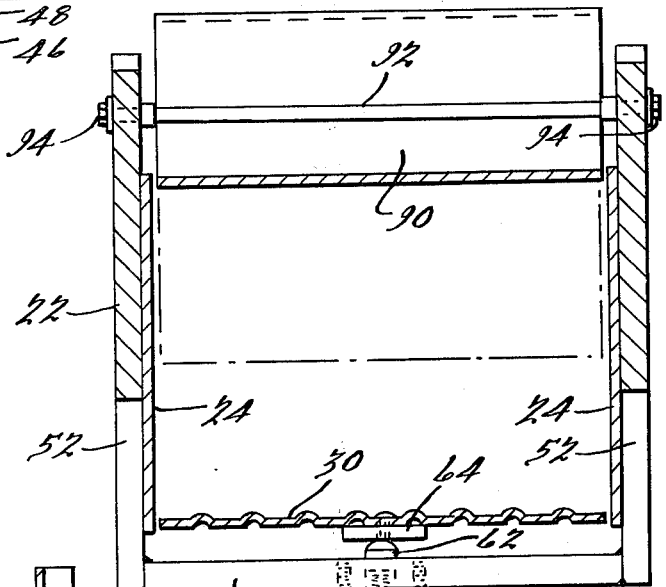
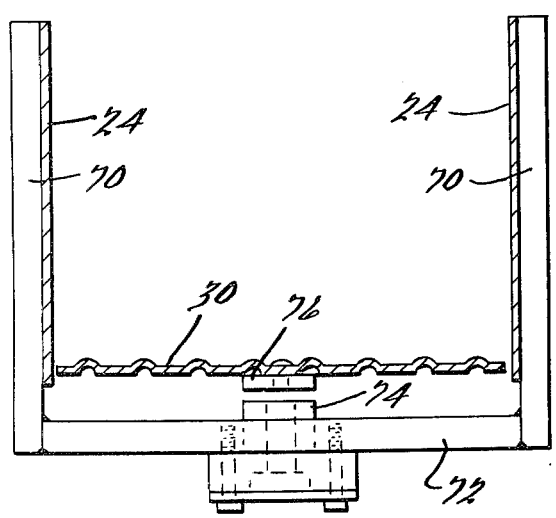

WORKPIECE DETECTION DEVICE FOR CYCLICAL MACHINES

BACKGROUND OF THE INVENTION

The present invention broadly relates to an automatic detection device for positively sensing the ejection or discharge of a workpiece from a cyclically operating, machine, such as a press, for example. Presses and similar machinery of the type adapted to successively perform a work operation on workpieces are frequently operated by means of an automatic control circuit to achieve automatic cyclical operations. Such machinery further includes automatic ejection devices for extracting and discharging a workpiece after each operating cycle and may also advantageously be equipped with automatic loaders for feeding new workpieces into the machine at the completion of each operating cycle.

It has heretofore been proposed to include in such automatic machinery detection devices for sensing a malfunction in one or more operating steps of the machine cycle to abruptly stop machine operation in the event of a malfunction thus avoiding damage to the machine components and/or workpieces being processed. In automatic presses, for example, it has heretofore been proposed to employ detection devices for detecting the ejection of a workpiece from the press at the completion of an operating cycle so as to avoid a so-called double strike. Such prior art devices frequently employ various photoelectric cell arrangements, probes, and other sensing devices for detecting the discharge of a part from the press. Typical of such detection devices is the deflectable probe disposed in a discharge chute in accordance with the arrangement illustrated in U.S. Pat. No. 3,656,139. Unfortunately, detection devices of the types heretofore known have been susceptible to being triggered by pieces of flash metal, the machine operators hands, and extraneous matter in the vicinity of the machine producing a false indication that workpiece ejection has occurred whereby a double strike occasionally occurs causing severe damage to the press dies.

The present invention overcomes the problems and disadvantages associated with prior art devices for ejected workpieces which is less susceptible to inadvertent triggering providing positive indication that actual ejection had occurred. The detection device of the present invention is further characterized as being of simple design, durable operation and control, versatile use, and economical manufacture.

SUMMARY OF THE INVENTION

The benefits and advantages of the present invention are achieved by an improved detection device adapted to be associated with a cyclically operating machine incorporating a control circuit for controlling the machine drive mechanism and further including ejection means for ejecting a workpiece from the machine after each operating cycle. The detection device is interlocked with the central machine control circuit for interrupting operation and preventing initiation of the next operating cycle in the event of a malfunction in the ejection of a workpiece. The detection device comprises a chute including a pivotally mounted section having an upstream portion and a downstream portion, the downstream portion being moveable to and from a raised position and a lowered, or actuated, position in response to the weight of an ejected workpiece on the pivotally mounted section. The pivotally mounted section is normally biased to the raised position and sensing means are provided for sensing the lowered, or actuated, position of the section indicative of the event or occurrence of an ejected workpiece which in turn is communicated to the central control circuit.

Additional benefits and advantages of the present invention will become apparent upon a reading of the description of the preferred embodiments taken in conjunction with the accompanying drawings.

BRIEF DESCRIPTION OF THE DRAWINGS

FIG. 3 is a magnified transverse sectional view of the detection device shown in FIG. 1 and taken substantially along with line 3—3 thereof;

FIG. 4 is a magnified vertical sectional view of the stop mechanism of the pivotal section of the detection device shown in FIG. 3 and taken substantially along the line 4—4 thereof;

FIG. 5 is a transverse sectional view of the detection device shown in FIG. 1 and taken substantially along the line 5—5 thereof; and FIG. 6 is a transverse sectional view of the detection device shown in FIG. 1 and taken substantially along the line 6—6 thereof.

DESCRIPTION OF THE PREFERRED EMBODIMENTS

Figure 1:
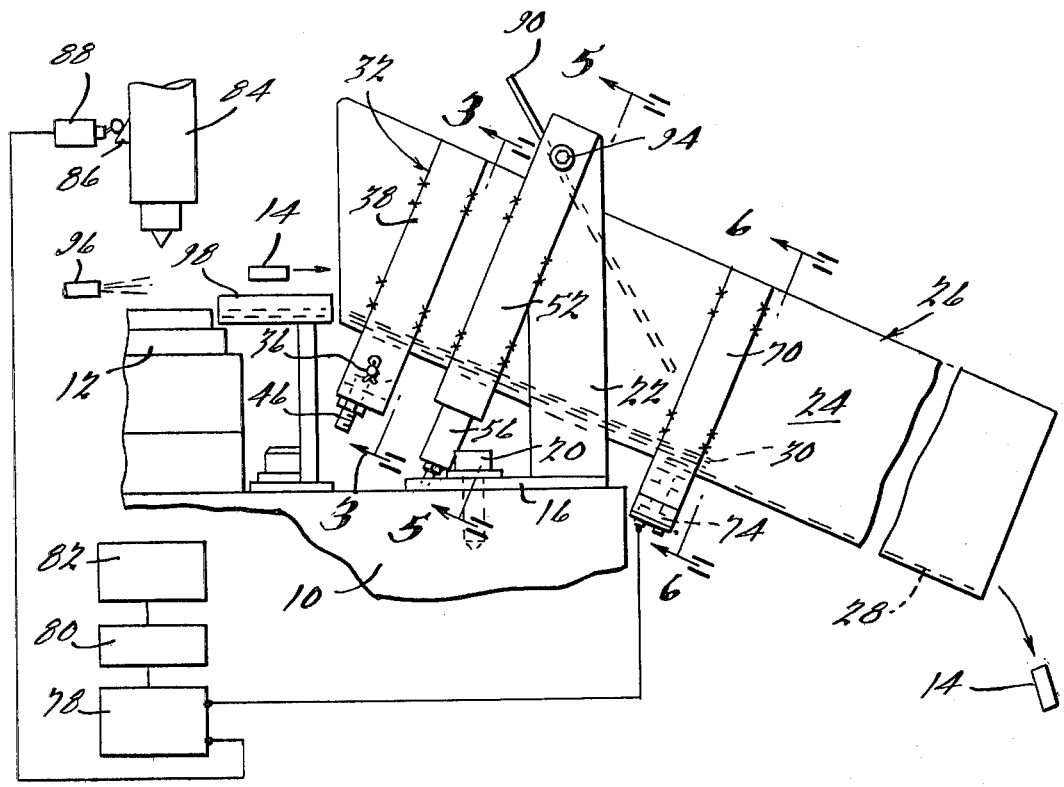
FIG. 1 is a side elevational view, partly schematic, of a detection device constructed in accordance with the preferred embodiments of the present invention, mounted on the side of a cyclical operating machine such as a press fragmentarily shown.
Figure 2:
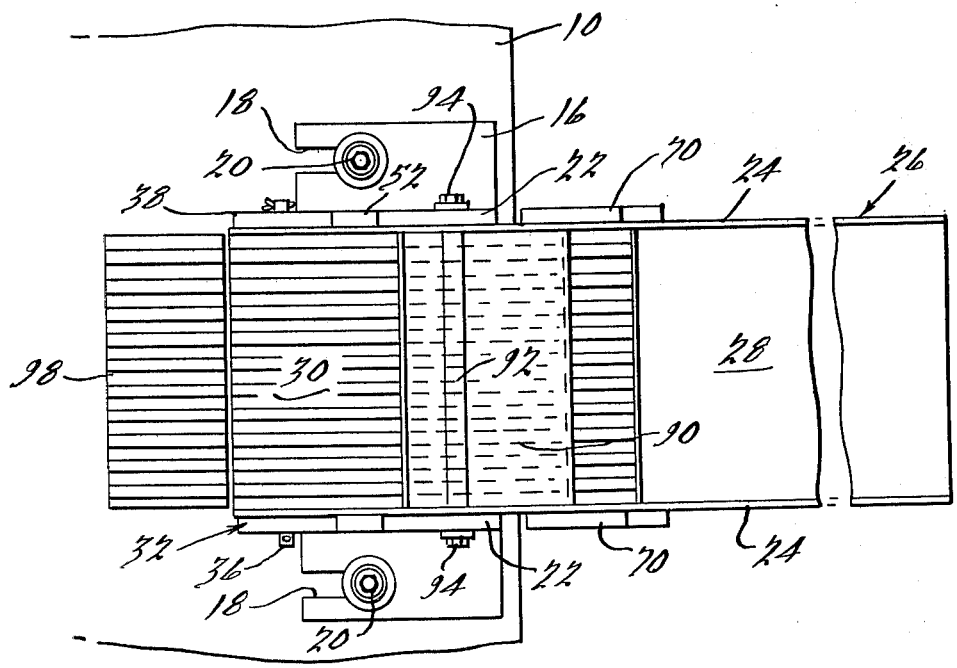
FIG. 2 is a plan view of the detection device shown in FIG. 1.

Referring now in detail to the drawings, and as may be best seen in FIGS. 1 and 2, a detection device constructed in accordance with the preferred embodiments of the present invention is shown mounted on a bed 10 of a cyclically operating machine, such as a press, and adjacent to a die assembly 12. The detection device receives workpieces, indicated at 14 in FIG. 1, upon ejection from the die assembly 12 after each machine operating cycle. The detection device includes a downwardly angularly inclined chute 26 having a base plate 16 formed with slots 18 for adjustably securing the device on the bed 10 such as by means of machine screws 20. A pair of upright, transversely spaced, members 22 are affixed to the base plate 16 and the side panels 24 of the inclined chute 26. The lower, or right hand, end of the chute 26 as viewed in FIG. 1 is provided with a stationary section 28 for discharging the detected workpieces into a suitable hopper or tote box (not shown). The upper, or left hand, end of the chute 26 as viewed in FIG. 1 is provided with a pivotally mounted section 30 which is moveable to and from a normally raised position, as shown in dotted lines in FIG. 1, to a lowered, or actuated, position in response to the weight of a workpiece thereon. The section 30 is corrugated, as viewed in transverse cross-section, to reduce friction thereby facilitating sliding of the workpiece through the chute.

The section 30 is pivotally mounted by the arrangement best seen in FIGS. 1–4. A U-shaped bracket 32, including a transverse cross member 34, is secured to the outer faces of the side panels 24 of the chute at a position adjacent to the inlet, or upstream, end thereof.

A shaft 36 extends between the upright side members 38 of the bracket 32 and is secured at its ends by means of cotter pins 40. A pair of pivot members comprising an arcuate plate 42 and a tubular spacer 44 are rotatably supported on the shaft 36. The pivotally mounted section 30 is rigidly secured, such as by welding, to the upper edges of the arcuate plates 42. The outer edges of the tubular spacers 44 are adapted to be disposed in contact with the inner faces of the side members 38 to maintain the pivotally mounted section 30 in appropriate transverse alignment relative to the side panels 24 of the chute 26. A pair of threaded stop screws 46 are threadably secured in the cross members 34 and retained by nuts 48. The upper ends of the projecting shanks of the stop screws 46 are adapted to be disposed in engagement with an arcuate surface 50 of the arcuate plates 42 when the moveable section 30 is in the raised position preventing further upward movement of the downstream portion of the moveable section 30 beyond a preselected position. Appropriate adjustment of the stop screws controls the raised position of the moveable base in a manner and for the purposes as subsequently to be described.

Referring now to FIGS. 1 and 5 of the drawings, the pivotally mounted section 30 is normally urged to the raised position by biasing means comprising a spring and plunger arrangement mounted on a U-shaped bracket comprising a pair of upright side member 52 and a lower cross member 54 as indicated in FIG. 5. The side members 52 are affixed to the side panels 24 of the chute assembly and to the upright members 22 as shown in FIG. 1. A mounting block 56 is secured substantially midway between the side members to the underside of the cross member 54 as shown in FIG. 5. The mounting block 56 is formed with a bore 58 in which is mounted a coil spring 60 and a slidable plunger. The spring 60 is disposed in biasing contact against the underside of the plunger 62 which projects above the upper surface of the cross member 54. The moveable section 30 is provided with a pad 64 affixed to the underside thereof which is engaged by the upper end of the plunger 62. The amount of compression of the coil spring 60 and the corresponding upward biasing force of the plunger 62 against the pivotally mounted section 30 is adjustable by means of a screw 66 and lock nut 68 acting against the lower end of the coil spring 60 as viewed in FIG. 5. In accordance with this arrangement, axial positioning of the adjusting screw 66 will vary the amount of compression of the coil spring and the biasing force applied to the pivotally mounted section 30 to maintain the base in a normally raised or unactuated position. A corresponding increase or decrease in the biasing force can readily be effected to accommodate workpieces of various weights.

In accordance with a preferred practice, the coil spring 60 is adjusted to apply an upward biasing force somewhat smaller than the downwardly biasing force of the weight of an ejected workpiece during its travel downwardly along the moveable base from a position from the upstream section thereof to the downstream end portion. In so doing, small pieces of flash metal and scrap which may be discharged into the chute assembly will not cause deflection of the pivotally mounted section 30 to a lowered, or actuated, position because of their insufficient weight thereby reducing the possibility of inadvertent triggering of the detection device. Accordingly, the pivotally mounted section 30 is normally retained in the raised or unactuated position by the biasing means and the raised position is controlled by the stop screws 46 as previously described in connection with FIG. 4.

Referring now to FIGS. 1 and 6, a U-shaped bracket comprising upright side members 70 and a cross member 72 is secured to the side panels 24 of the chute assembly 26 at a position adjacent to the downstream end portion of the pivotally mounted section 30. A sensing device, such as a proximity detector 74, is secured to the midpoint of the cross member 72 and a striker 76 is affixed in vertical alignment to the underside of the pivotally mounted section 30. The proximity detector 74 is of standard design and comprises an electrical signal generator which is actuated by another member, such as the striker 76, coming near it. The arrangement as illustrated in FIG. 6 shows the pivotally mounted section 30 in the raised, or nonactuated, position. In response to the weight of a ejected workpiece passing downwardly along the section 30, downward deflection of the section 30 occurs as the weight of the workpiece overcomes the force of the spring 60 causing the striker 76 to approach the proximity detector 74. This, in turn, causes the detector to produce an electrical signal which is conveyed to the central control circuit indicating the event of an ejected workpiece.

It will be appreciated that alternative satisfactory sensing devices can be employed in lieu of the specific proximity detector 74 shown in FIG. 6. For example, microswitches, fluidic sensors, pneumatic sensing devices and the like can be employed. Regardless of the specific type of sensing device employed, it is interlocked with the central machine control circuit in accordance with the arrangement as schematically illustrated in FIG. 1.

As shown in FIG. 1, the proximity detector 74 is electrically connected to a relay control 78 of any of the types well known in the art which in turn is connected to a relay 80 which controls the machine drive mechanism indicated at 82. In the exemplary arrangement illustrated in FIG. 1, the cyclically operating machine includes a reciprocable ram 84 mounted above the die assembly 12 which is provided with a cam 86 for actuating a limit switch 88 at the completion of each machine operating cycle. The limit switch 88 is electrically connected to the relay control 78 stopping a repeat machine cycle unless the proximity switch 74 has been actuated.

In accordance with a preferred embodiment of the present invention and as best seen in FIGS. 1, 2 and 5, a deflector plate 90 is mounted by means of a transverse shaft 92 between the upper ends of the upright side members 22 and is disposed in a downwardly inclined position between the side panels 24 of the chute assembly. The deflector plate 90 assures that any ejected workpieces which may be airborne during their ejection from the die assembly are deflected downwardly into contact with the downstream portion of the pivotally mounted base 30 assuring detection of the event of ejection. The deflector plate 90 can be adjusted at the appropriate angular position by means of screws 94 threadably engaged into the ends of the shaft 92.

In operation, a workpiece is loaded into the die assembly 12 and the press initiates its operating cycle whereby the ram 84 moves downwardly performing a work operating of the workpiece. Upon subsequent elevating movement of the ram 84 as shown in FIG. 1, limit switch 88 is tripped communicating to the central control circuit the completion of a machine operated cycle. The die assembly 12 may be suitably provided with a mechanical ejection device or, alternatively, a pneumatic ejection device, fragmentarily indicated at 96 in FIG. 1, for extracting the workpiece 14 from the die assembly and directing it toward the inlet of the chute assembly 26 of the detection device. For this purpose, a guide plate 98 as shown in FIG. 1 is preferably provided for supporting the workpiece during its transfer between the die assembly and detection device. The workpiece thereafter moves downwardly by the action of gravity from the upstream to the downstream portion of the pivotally mounted base 30 whereby the weight thereof causes movement of the section 30 from the raised position to the lowered, or actuated, position triggering the proximity detector. The proximity detector in turn signals the relay control that an ejection event has taken place whereby the central machine control circuit signals the drive mechanism to initiate a repetitive operating cycle.

While it will be apparent that the invention herein disclosed is well calculated to achieve the benefits and advantages as hereinabove set forth, it will be appreciated that the invention is susceptible to modification, variation and change without departing from the spirit thereof.

The embodiments of the invention in which an exclusive property or privilege is claimed are defined as follows:

1. In a cyclically operating machine for performing an operation on successive workpieces including ejection means for ejecting a workpiece after each operating cycle and control means associated with the machine drive means for initiating each operation cycle, a detection device interlocked with the control means for sensing the event of a workpiece having been ejected to enable initiation of the next machine operating cycle, said detection device comprising a chute adapted to be disposed adjacent to machine for receiving an ejected workpiece, said chute including a pivotally mounted base having an upstream portion and a downstream portion wherein said downstream portion is moveable between raised and lowered positions, biasing means for normally urging said base toward said raised position, said base being moveable to said lowered position in response to the weight of an ejected workpiece, the improvement comprising sensing means for sensing said pivotally mounted base when in said lowered position indicative of the event of an ejected workpiece and means for adjusting the force exerted by the biasing means on said pivotally mounted base to accommodate workpieces of various weights.

2. The detection device as defined in claim 1 wherein said detection device includes framework for supporting said chute, said base being pivotally mounted on said framework along said upstream portion thereof providing pivoting movement of said downstream portion between said raised and said lowered positions.

3. The detection device as defined in claim 1 in which said chute is disposed in a downwardly inclined position with said upstream portion of said base disposed at an elevated position relative to said downstream portion.

4. The detection device as defined in claim 1 further including stop means for restricting upward movement of said base beyond said raised position.

5. The detection device as defined in claim 4 wherein said stop means includes adjustment means for controlling the raised position of said pivotally mounted base.

6. The detection device as defined in claim 1 further including deflector means on said framework for deflecting ejected workpieces towards said base.

7. The detector device as defined in claim 1 in which said biasing means comprises resilient spring means mounted on said framework and disposed in upward biasing relationship against the underside of said base.

8. The detection device as defined in claim 1 in which said sensing means is mounted on said framework in spaced relationship from the underside of said base when in said raised position.

9. The detection device as defined in claim 1 in which said sensing means is mounted on said framework adjacent to said downstream portion of said base.

10. The detection device as defined in claim 1 in which said sensing means comprises a proximity sensing device.

* * * * *